(12) United States Patent
Roberts et al.

(10) Patent No.: US 11,681,142 B2
(45) Date of Patent: Jun. 20, 2023

(54) TWO-LENS OPTICAL SYSTEM, BEAM COMBINING MODULE, PROJECTOR, AND METHOD FOR ASSEMBLING TWO-LENS OPTICAL SYSTEM

(71) Applicant: SHARP KABUSHIKI KAISHA, Sakai (JP)

(72) Inventors: Peter John Roberts, Oxford (GB); Noriaki Fujii, Sakai (JP); Shin Itoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 437 days.

(21) Appl. No.: 17/054,007

(22) PCT Filed: May 14, 2018

(86) PCT No.: PCT/JP2018/018582
§ 371 (c)(1),
(2) Date: Nov. 9, 2020

(87) PCT Pub. No.: WO2019/220509
PCT Pub. Date: Nov. 21, 2019

(65) Prior Publication Data
US 2021/0239968 A1 Aug. 5, 2021

(51) Int. Cl.
*G02B 26/08* (2006.01)
*G02B 27/14* (2006.01)
(52) U.S. Cl.
CPC ....... *G02B 26/0875* (2013.01); *G02B 27/141* (2013.01)

(58) Field of Classification Search
CPC .......................... G02B 26/0875; G02B 27/141
USPC ......................................... 359/196.1
See application file for complete search history.

(56) References Cited

U.S. PATENT DOCUMENTS

| 4,823,334 | A | 4/1989 | Tanaka et al. |
| 6,055,113 | A | 4/2000 | Yamamoto et al. |
| 6,974,939 | B1 | 12/2005 | Yamada |
| 8,045,426 | B2* | 10/2011 | Mori ............. G11B 7/1376 369/44.23 |
| 9,116,421 | B1 | 8/2015 | Rutherford |

(Continued)

FOREIGN PATENT DOCUMENTS

JP 02-119002 A 5/1990

OTHER PUBLICATIONS

Pre-aligned Optics, http://www.optoskand.se/technology/prealigned-optics/.

(Continued)

*Primary Examiner* — Euncha P Cherry
(74) *Attorney, Agent, or Firm* — ScienBiziP, P.C.

(57) ABSTRACT

[Object] To provide (i) a two-lens optical system, (ii) a beam combining module, (iii) a projector, and (iv) a method for assembling a two-lens optical system each of which allows for an improved lens positioning sensitivity [Means to Attain the Object] A two-lens optical system (100) includes a first lens (1) for use in collimation adjustment, the first lens being configured to move along only an optical axis of light emitted from a light source; and a second lens (2) for use in beam steering, the second lens being configured to move along only two axes perpendicular to the optical axis.

13 Claims, 10 Drawing Sheets

(56) References Cited

U.S. PATENT DOCUMENTS

2005/0280907 A1   12/2005   Hayashi et al.

OTHER PUBLICATIONS

Maciej Baranski et al., "Micro-optical design of a three-dimensional micronlens scanner for vertically intergrated micro-opto-electro-mechanical systems", XP055793870, Applied Optics, Aug. 1, 2015, vol. 54, No. 22.

* cited by examiner

TWO-LENS OPTICAL SYSTEM, BEAM COMBINING MODULE, PROJECTOR, AND METHOD FOR ASSEMBLING TWO-LENS OPTICAL SYSTEM

TECHNICAL FIELD

The present invention relates to a two-lens optical system, a beam combining module, a projector, and a method for assembling a two-lens optical system.

BACKGROUND ART

In a case where an optical device including a lens has a light combining efficiency that changes by a large amount with respect to the amount of movement of the lens, it is not easy to adjust the light combining efficiency so that the light combining efficiency is within a suitable range. The optical device thus desirably has a light combining efficiency that changes by only a small amount with respect to the amount of movement of the lens. The optical device, in other words, desirably has a small lens positioning sensitivity.

The description below uses (1) the term "single-lens device" to refer to an optical device including a single lens to collimate or focus light emitted from a light source and (2) the term "two-lens device" to refer to an optical device including two lenses to collimate or focus light emitted from a light source. On the assumption that the focal length of a single-lens device and the effective focal length of a two-lens device are equal to each other, the two-lens device normally has a lower lens positioning sensitivity.

Patent Literatures 1 to 3 and Non-patent Literature 1 each disclose a two-lens device.

CITATION LIST

Patent Literature

PTL 1: U.S. Pat. No. 4,823,334
PTL 2: U.S. Pat. No. 6,055,113
PTL 3: U.S. Pat. No. 6,974,939

Non Patent Literature

NPL 1: http://www.optoskand.se/technology/prealigned-optics/

SUMMARY OF INVENTION

Technical Problem

Unfortunately, none of the two-lens devices disclosed in Patent Literatures 1 to 3 and Non-patent Literature 1 is configured to carry out collimation adjustment and beam steering in view of the balance between collimation sensitivity and beam steering sensitivity. In that regard, the optical devices disclosed in Patent Literatures 1 to 3 and Non-patent Literature 1 leave room for improvement in terms of lens positioning sensitivity.

The present invention has been accomplished in view of the above issue. It is an object of the present invention to provide (i) a two-lens optical system, (ii) a beam combining module, (iii) a projector, and (iv) a method for assembling a two-lens optical system each of which allows for an improved lens positioning sensitivity.

Solution to Problem

In order to attain the above object, a two-lens optical system in accordance with an embodiment of the present invention is a two-lens optical system, including: a first lens for use in collimation adjustment, the first lens being configured to move along only an optical axis of light emitted from a light source; and a second lens for use in beam steering, the second lens being configured to move along only two axes perpendicular to the optical axis.

With the above configuration, the two-lens optical system is configured such that the first lens is used for collimation adjustment, whereas the second lens is used for beam steering.

The above configuration thus allows each of the first lens and the second lens to have a small positioning sensitivity. The two-lens optical system is configured such that the respective positions of the first lens and the second lens can be adjusted with increased accuracy and that the first lens and the second lens can be aligned with improved tolerances as compared to a single-lens device.

In order to attain the above object, a method in accordance with an embodiment of the present invention for assembling a two-lens optical system is a method for assembling a two-lens optical system, the two-lens optical system including: a first lens; a first support base configured to constrain movement of the first lens in such a manner that the first lens is movable along only an optical axis of light emitted from a light source; a second lens; and a second support base configured to constrain movement of the second lens in such a manner that the second lens is movable along only two axes perpendicular to the optical axis, the method comprising the steps of: (a) moving the first lens along the optical axis for collimation adjustment of the two-lens optical system; (b) after the step (a), moving the second lens along at least one of the two axes for beam steering of the two-lens optical system; (c) after the step (a) or (b), fixing the first lens to the first support base; and (d) after the step (b), fixing the second lens to the second support base.

In order to attain the above object, a method in accordance with an embodiment of the present invention for assembling a two-lens optical system is a method for assembling a two-lens optical system, the two-lens optical system including: a first support base configured to move along only an optical axis of light emitted from a light source, a first lens configured to move together with the first support base; a second support base configured to move along only two axes perpendicular to the optical axis; and a second lens configured to move together with the second support base, the method including the steps of: (a) moving the first support base for collimation adjustment of the two-lens optical system; (b) after the step (a), moving the second support base for beam steering of the two-lens optical system; (c) after the step (a) or (b), fixing the first lens to the first support base; and (d) after the step (b), fixing the second lens to the second support base.

The above arrangement makes it possible to easily assemble a two-lens optical system capable of producing the above effects.

Advantageous Effects of Invention

An embodiment of the present invention makes it possible to provide (i) a two-lens optical system, (ii) a beam combining module, (iii) a projector, and (iv) a method for assembling a two-lens optical system each of which allows for an improved lens positioning sensitivity.

DESCRIPTION OF EMBODIMENTS

Embodiment 1

Basic Configuration of Collimation System 100

Figure 1:
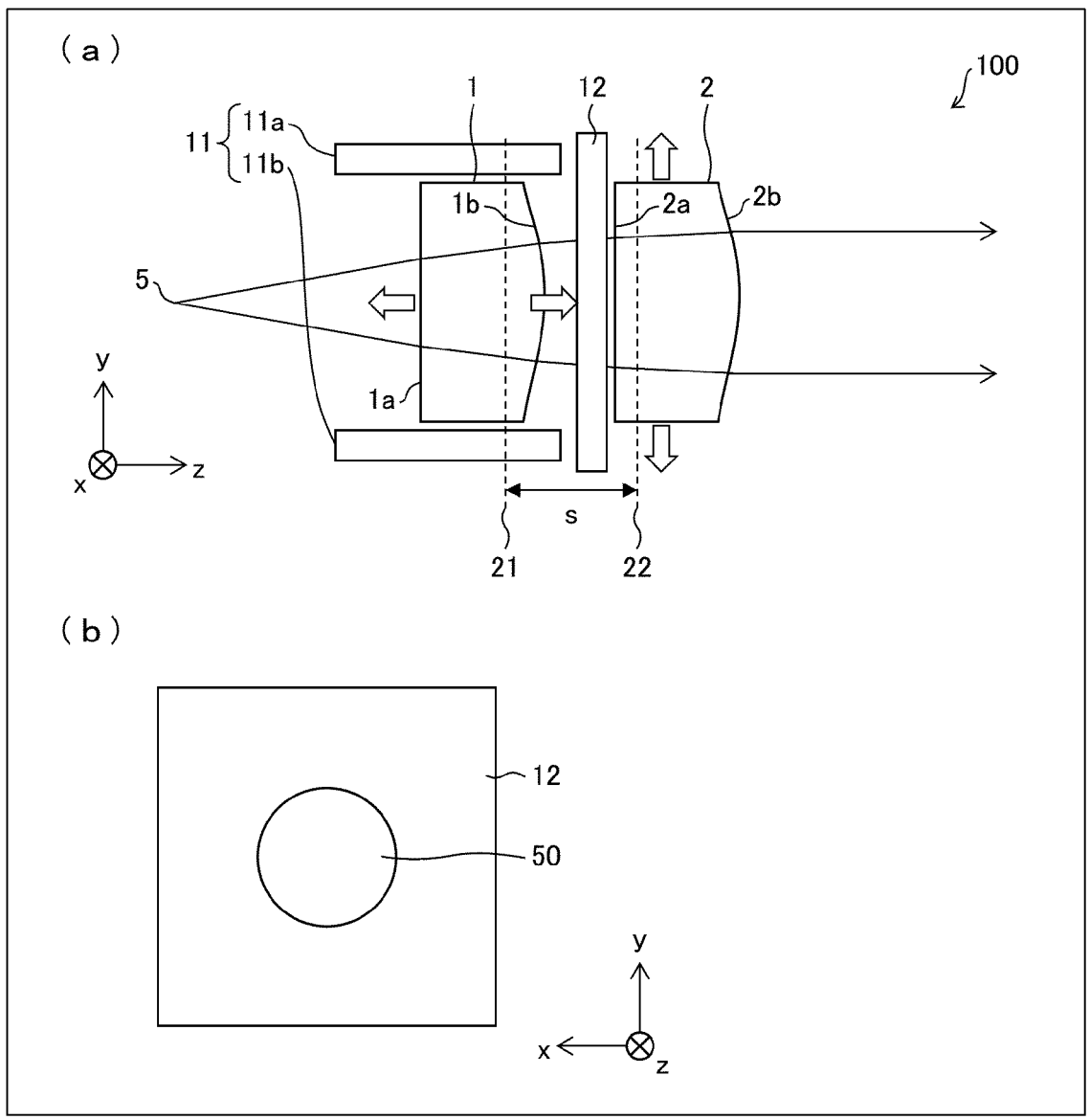
FIG. 1 is a diagram schematically illustrating a collimation system of an embodiment of the present invention.

The following description will discuss an embodiment of the present invention with reference to, for example, FIG. 1. FIG. 1 is a diagram schematically illustrating a collimation system (two-lens optical system) 100 of the present embodiment.

The description below first deals with the x axis, y axis, and z axis shown in FIG. 1. The z axis extends in the direction in which light emitted from a light source 5 travels (that is, the optical axis direction). The z axis thus extends in the left-right direction of FIG. 1. The y axis extends in a direction orthogonal to the z axis, and extends in the up-down direction of FIG. 1. The x axis extends in the direction orthogonal to the y axis and z axis.

The collimation system 100 is configured to collimate light emitted from a light source 5, and includes a first lens 1, a second lens 2, a first support base 11, a second support base 12, and a light source 5. The light source 5 may be understood as either being included in the collimation system 100 or not being included in the collimation system 100.

The light source 5 may be a laser element or a light-emitting diode (LED), for example. The light emitted from the light source 5 is not limited to any particular wavelength. The description below assumes that the light source 5 is a laser element.

The first lens 1 is a planoconvex lens. The first lens 1 has a flat surface 1a and a convex surface 1b. The light emitted from the light source 5 is incident on the flat surface 1a and exits from the convex surface 1b. The first lens 1 guides light from the light source 5 toward the second lens 2. The first lens 1 has a focal length $f_1$. The first lens 1 may be a lens other than a planoconvex lens, and may be a biconvex lens, for example.

The second lens 2 is a planoconvex lens. The second lens 2 has a flat surface 2a and a convex surface 2b. The light traveling from the first lens 1 is incident on the flat surface 2a and exits from the convex surface 2b. The second lens 2 has a focal length $f_2$. The second lens 2 may be a lens other than a planoconvex lens, and may be a biconvex lens, for example.

The description below uses (i) the term "front" about a lens to refer to the side on which light is incident and (ii) the term "back" about a lens to refer to the side from which light exits. In the description below, the first lens 1 has a back principal plane 21, and the second lens 2 has a front principal plane 22. The back principal plane 21 and the front principal plane 22 are separated from each other by a separation s.

The first lens 1 is placed on a first support base 11. The first support base 11 is connected to a first moving section (not shown) configured to move the first support base 11 along the z axis. The first moving section may alternatively be contained in the first support base 11. The first moving section is, for example, an actuator. The first support base 11 is constrained along the x axis and/or y axis.

The first support base 11 includes a first support base component 11a and a first support base component 11b. The first support base component 11a and the first support base component 11b sandwich the first lens 1 by being in contact with two respective side surfaces of the first lens 1 that are different from the flat surface 1a and the convex surface 1b. The first support base component 11a and the first support base component 11b are configured to move together. The first support base component 11a and the first support base component 11b may be separate from each other or integrated with each other.

The second lens 2 is placed on a second support base 12. The second support base 12 is connected to a second moving section (not shown) configured to move the second support base 12 along the x axis and/or y axis. The second moving section may alternatively be contained in the second support base 12. The second moving section is, for example, an actuator. The second support base 12 is constrained along the z axis.

The flat surface 2a of the second lens 2 is in contact with the second support base 12. The second support base 12 is in the shape of, for example, a rectangular parallelepiped, and has an aperture 50 at its center. The light traveling from the first lens 1 is incident on the second lens 2 through the aperture 50.

The combination of the first support base 11 and the first lens 1 and the combination of the second support base 12 and the second lens 2 may be configured as follows: The first support base 11 is fixed to a housing (not shown), and is thus immovable relative to the housing. The first lens 1 is attached to the first support base 11. The first lens 1 is movable within and/or on the first support base 11. Similarly, the second support base 12 is fixed to the housing (not shown), is thus immovable relative to the housing. The second lens 2 is attached to the second support base 12. The second lens 2 is movable within and/or on the second support base 12. After collimation adjustment and beam steering (described later), the first lens 1 and the second lens 2 are fixed respectively to the first support base 11 and the second support base 12 with use of, for example, an adhesive. The adhesive may, depending on the kind thereof, form a thin layer. This allows the adhesive to keep its adhesive force strong even in a case where the external environment (for example, air temperature) has changed. The first support base 11 may include a lens holder (not shown) configured to receive the first lens 1. The second support base 12 may include a lens holder (not shown) configured to receive the second lens 2. The first lens 1 and the second lens 2 may be fixed respectively to the first support base 11 and the second support base 12 with use of a member other than an adhesive (for example, a fastener).

With the above configuration, (i) in a case where the first lens 1 has been fixed to the first support base 11, the first support base 11 constrains the movement of the first lens 1 (or the combination of the first lens 1 and the corresponding lens holder), whereas (ii) in a case where the second lens 2 has been fixed to the second support base 12, the second support base 12 constrains the movement of the second lens 2 (or the combination of the second lens 2 and the corresponding lens holder).

As described above, the collimation system 100 may be configured such that the first support base 11 and the second support base 12 are fixed to the housing and that the first lens 1 is moved within and/or on the first support base 11, whereas the second lens 2 is moved within and/or on the second support base 12. This configuration is also applicable to Embodiments 2 to 6 described later.

Although the description below assumes that the first support base 11 and the second support base 12 are movable relative to the housing, Embodiments 1 to 6 may each alternatively be configured as described above.

The following description will discuss how the collimation system 100 operates.

Light emitted from the light source 5 is incident on the first lens 1. The first lens 1 is movable along the z axis by means of the operation of the first support base 11. In other words, the first support base 11 adjusts the position of the first lens 1 along the z axis. This allows collimation adjustment to be carried out for the collimation system 100.

The light from the light source 5 travels through the first lens 1 and is then incident on the second lens 2. The second lens 2 is movable along the x axis and/or y axis by means of the operation of the second support base 12. In other words, the second support base 12 adjusts the position of the second lens 2 along the x axis and/or y axis. This allows beam steering to be carried out for the collimation system 100.

The collimation adjustment and beam steering for the collimation system 100 are followed by fixing the first lens 1 and the second lens 2 to the first support base 11 and the second support base 12, respectively, with use of an adhesive, for example. Alternatively, the first lens 1 may be fixed to the first support base 11 after the collimation adjustment and before the beam steering. In this case, fixing after the beam steering is for the second lens 2 to the second support base 12.

The collimation system 100 is, as described above, configured such that the first support base 11 is used for collimation adjustment, whereas the second support base 12 is used for beam steering.

Beam-Steer Sensitivity

Figure 2:
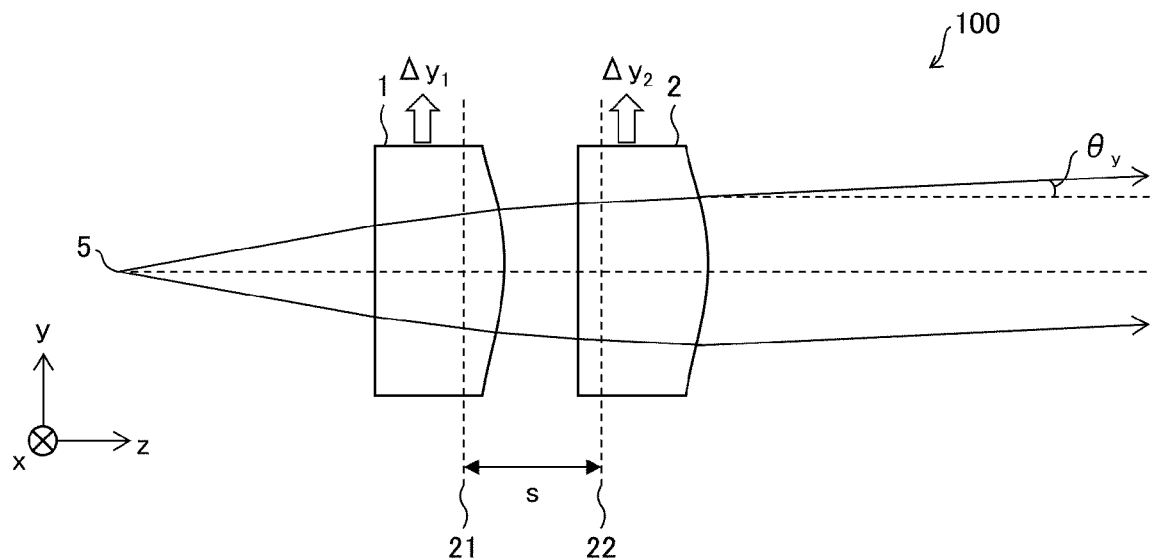
FIG. 2 is a diagram illustrating beam-steer sensitivity.
Figure 3:
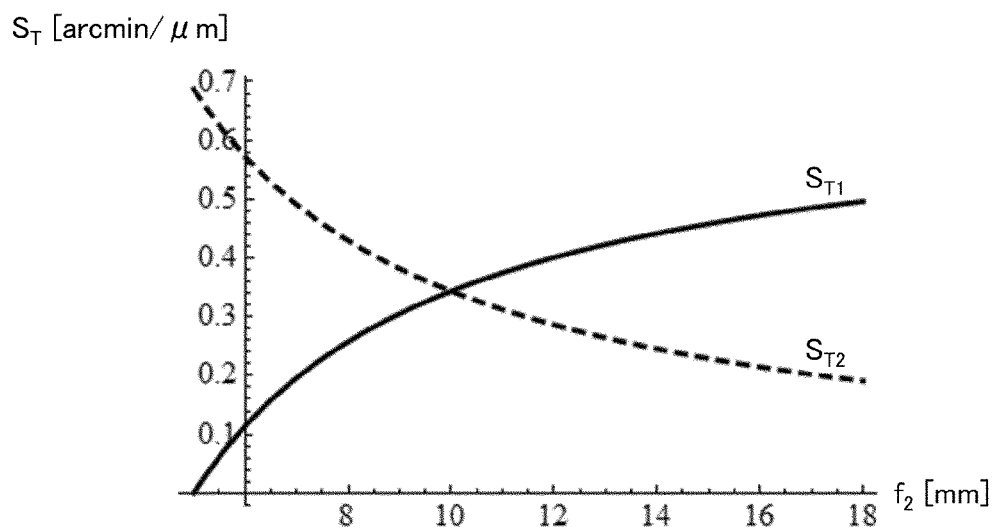
FIG. 3 is a graph illustrating how the focal length $f_2$ of a second lens is related to the respective beam-steer sensitivities of a first lens and the second lens.
Figure 4:
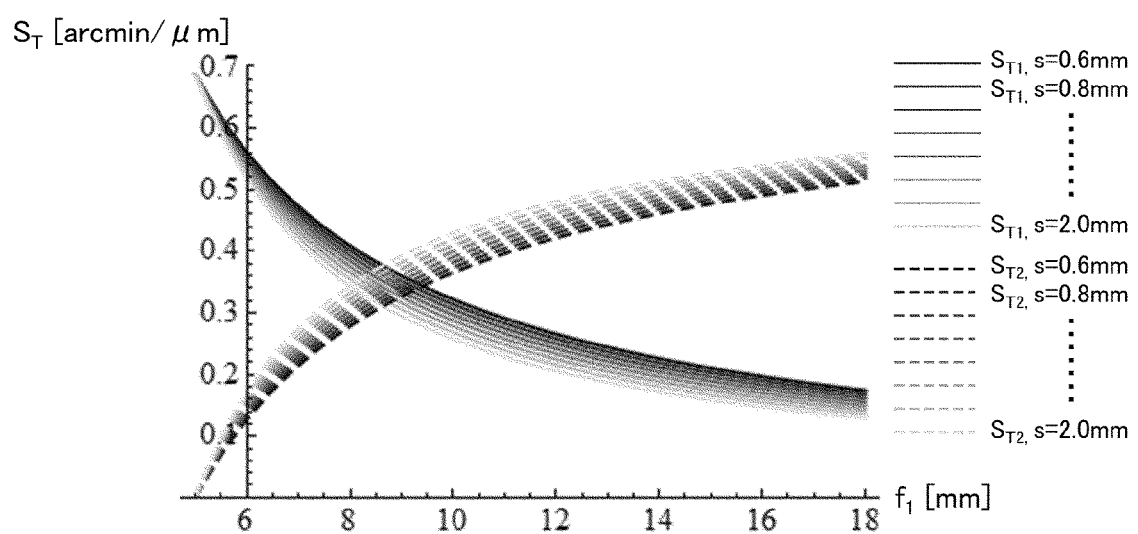
FIG. 4 is a graph illustrating how the focal length $f_1$ of a first lens is related to the respective beam-steer sensitivities of the first lens and a second lens, the graph illustrating a case where the separation (s) between a back principal plane of the first lens and a front principal plane of the second lens is changed between 0.6 mm to 2.0 mm.

The following description will discuss beam-steer sensitivity with reference to FIGS. 2 to 4. FIG. 2 is a diagram illustrating beam-steer sensitivity. FIG. 3 is a graph illustrating how the focal length $f_2$ of the second lens 2 is related to the respective beam-steer sensitivities of the first lens 1 and second lens 2. FIG. 4 is a graph illustrating how the focal length $f_1$ of the first lens 1 is related to the respective beam-steer sensitivities of the first lens 1 and second lens 2, the graph illustrating a case where the separation (s) between the back principal plane 21 of the first lens 1 and the front principal plane 22 of the second lens 2 is changed between 0.6 mm to 2.0 mm. FIGS. 3 and 4 assume that the two-lens device illustrated in FIG. 2 has an effective focal length f of 5 mm.

As illustrated in FIG. 2, light emitted from the light source 5 is incident on the first lens 1, and is then incident on the second lens 2. The following description will discuss the respective beam-steer sensitivities of the first lens 1 and second lens 2 for a case where the first lens 1 and second lens 2 are each moved in a lateral direction (that is, along the x axis or y axis).

The two-lens device illustrated in FIG. 2 is configured such that shifting one of the lenses laterally results in a beam-steer angle expressed in Formula 1 or 2 below.

1) The beam-steer sensitivity of the first lens 1 for a case where the first lens 1 has been shifted laterally $$S_{T1} = \delta\theta_x/\delta\Delta_{x1} = \delta\theta_y/\delta\Delta_{y1} = 1/f - 1/f_2 \quad \text{Formula 1}$$

2) The beam-steer sensitivity of the second lens 2 for a case where the second lens 2 has been shifted laterally $$S_{T2} = \delta\theta_x/\delta\Delta_{x2} = \delta\theta_y/\delta\Delta_{y2} = 1/f_2 \quad \text{Formula 2}$$

Once $f_1$ and s have been determined, $f_2$ can be calculated on the basis of Formula 3 below.

$$f_2 = f \times (f_1 - s)/(f_1 - f) \quad \text{Formula 3}$$

FIGS. 3 and 4 show A) to C) below.

A) As $f_1$ increases, the beam-steer sensitivity of the first lens 1 decreases.

B) As $f_1$ increases, $f_2$ decreases. As $f_2$ decreases, the beam-steer sensitivity of the second lens 2 increases.

C) In a case where $f_1 = f = 5$ mm in a single-lens device, the beam-steer sensitivity of the lens is indicated by $S_{T1}$. In a case where $f_1$ is approximately 9 mm in a two-lens device, the respective beam-steer sensitivities of a first lens 1 and second lens 2 are both approximately 50% the beam-steer sensitivity of a single-lens device.

As described above, the collimation system 100 has a beam-steer sensitivity significantly lower than the beam-steer sensitivity of a single-lens device.

Collimation Sensitivity

The following description will discuss collimation sensitivity of the collimation system 100. The collimation can be quantified on the basis of the position of the focus of a light source (for example, a laser diode). The collimation (c), expressed in diopters, is the inverse of the displacement v measured in meters.

Figure 5:
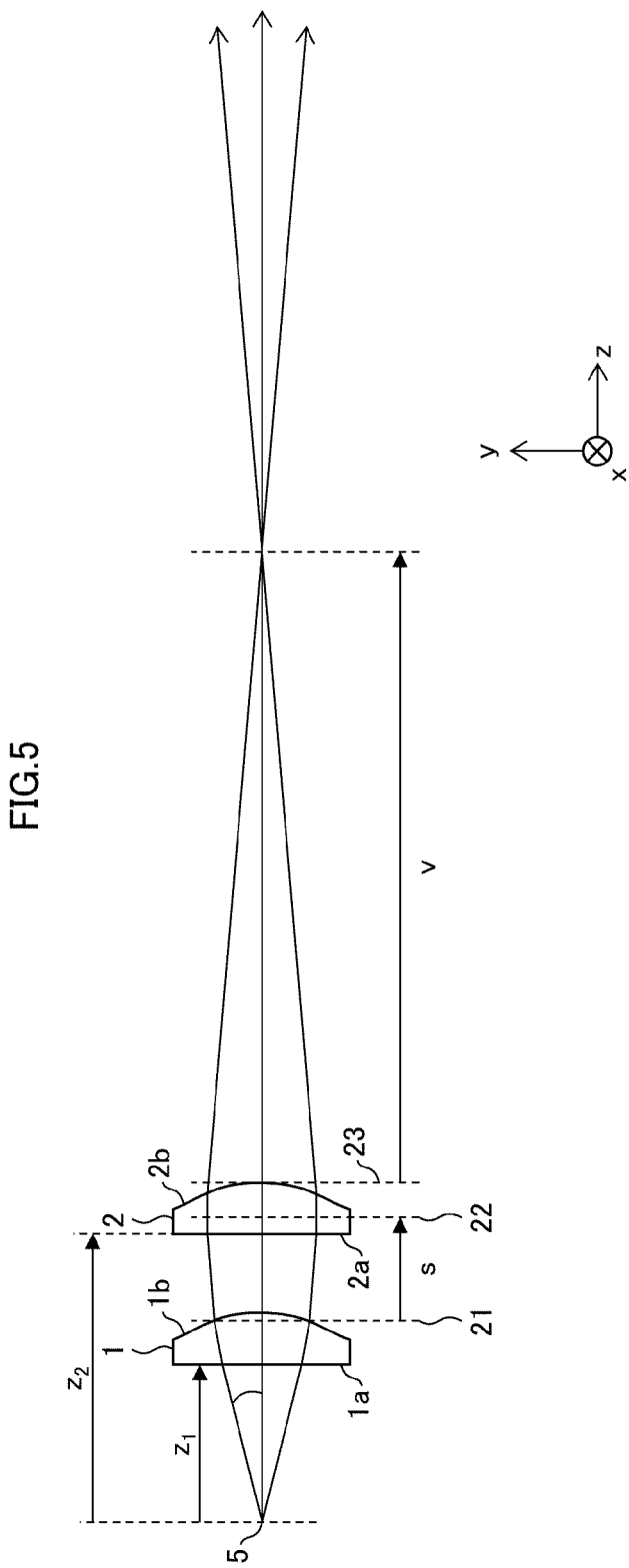
FIG. 5 is a diagram schematically illustrating a two-lens device.

FIG. 5 is a diagram schematically illustrating a two-lens device. FIG. 5 shows a plane 23, which extends through the apex of the convex surface 2b of the second lens 2 and which is parallel to the flat surface 2a. The displacement v is the distance between the focus of the two-lens device and the plane 23. In this case, the collimation c is calculated on the basis of Formula 4 below.

$$c = 1/v = [(1/f^2 - 1/f_2^2) \times \Delta Z_1 + (1/f_2^2) \times \Delta Z_2)] \quad \text{Formula 4}$$

where $Z_1$ is the distance between the light source 5 and the flat surface 1a, $Z_2$ is the distance between the light source 5 and the flat surface 2a, $\Delta Z_1$ is a small shift of the first lens 1 from $Z_{1c}$, $\Delta Z_2$ is a small shift of the second lens 2 from $Z_{2c}$, $Z_{1c}$ is the position of the first lens 1 for perfect collimation ($|c| \to 0$) at the effective focal length f, and $Z_2$ is the position of the second lens 2 for perfect collimation ($|c| \to 0$) at the effective focal length f.

Figure 6:
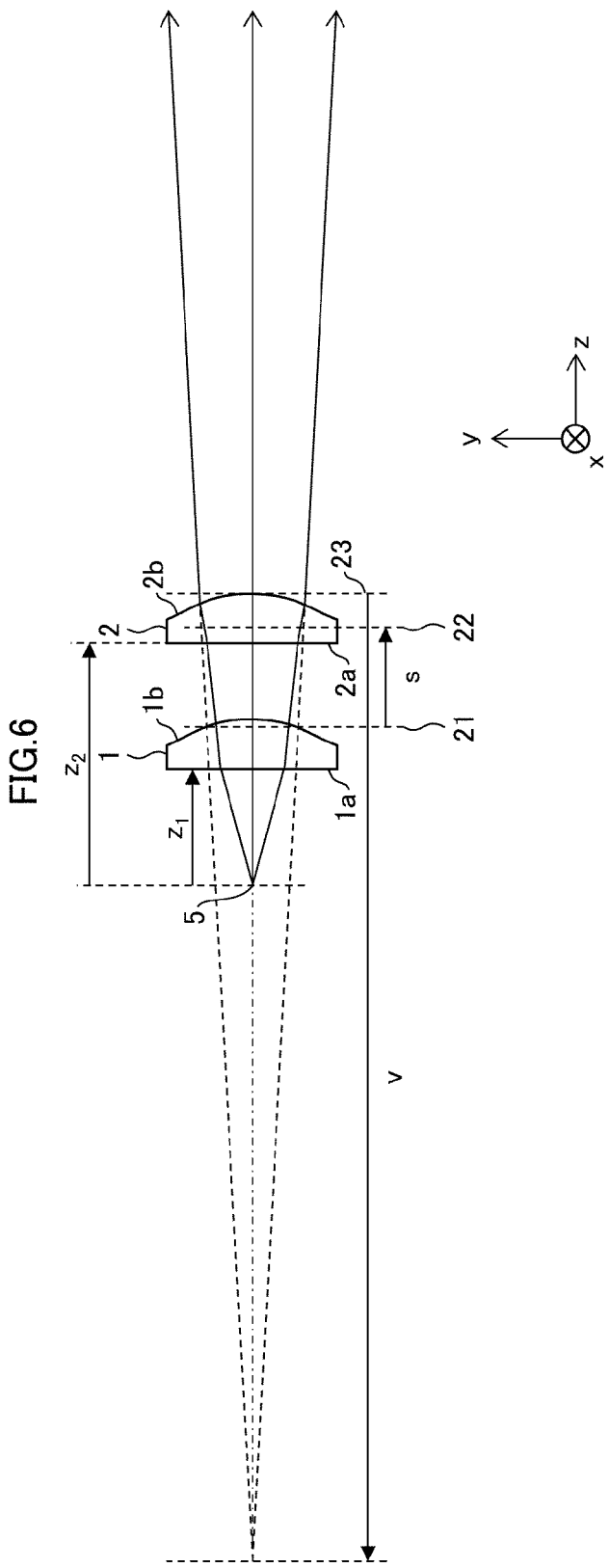
FIG. 6 is a diagram schematically illustrating a two-lens device with a virtual focus.

The collimation c of a two-lens device with a virtual focus can also be calculated on the basis of Formula 4. FIG. 6 is a diagram schematically illustrating a two-lens device with a virtual focus. FIG. 6 shows light diverging from the second lens 2. The two-lens device illustrated in FIG. 6 has a virtual focus on a side of the first lens 1 on which side the light source is present. The displacement v is the distance between the virtual focus of the two-lens device and the plane 23. The collimation c of the virtual two-lens device illustrated in FIG. 6 can also be calculated on the basis of Formula 4.

The collimation c of a single-lens device is calculated on the basis of Formula 5 below.

$$c = (\Delta z/f^2) \quad \text{Formula 5}$$

where $\Delta z$ is a small shift of the lens from the position for perfect collimation.

The collimation sensitivity of the first lens 1 in the longitudinal direction (Z direction) is calculated on the basis of Formula 6 below with reference to Formula 4.

$$S_{L1} = \delta c/\delta \Delta_{Z1} = (1/f^2 - 1/f_2^2) \quad \text{Formula 6}$$

Similarly, the collimation sensitivity of the second lens 2 in the longitudinal direction (Z direction) is calculated on the basis of Formula 7 below.

$$S_{L2} = \delta c/\delta \Delta_{Z2} = 1/f_2^2 \quad \text{Formula 7}$$

Figure 7:
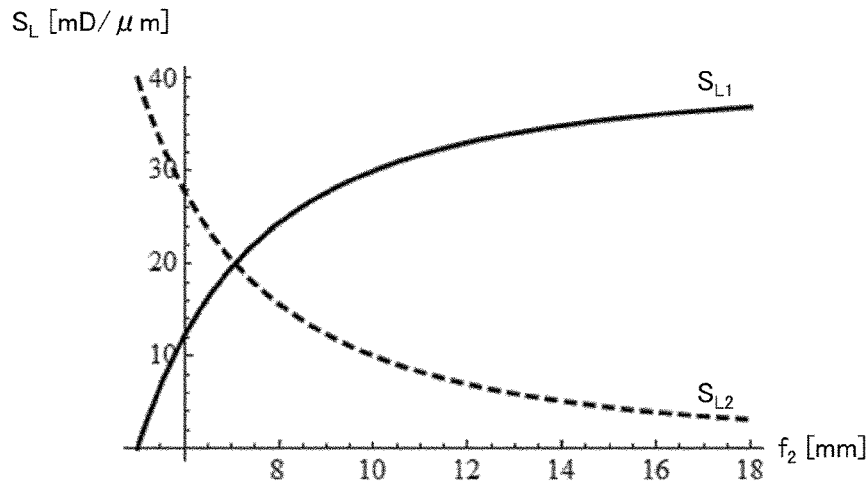
FIG. 7 is a graph illustrating how the focal length $f_2$ of a second lens is related to the respective collimation sensitivities of a first lens and the second lens.
Figure 8:
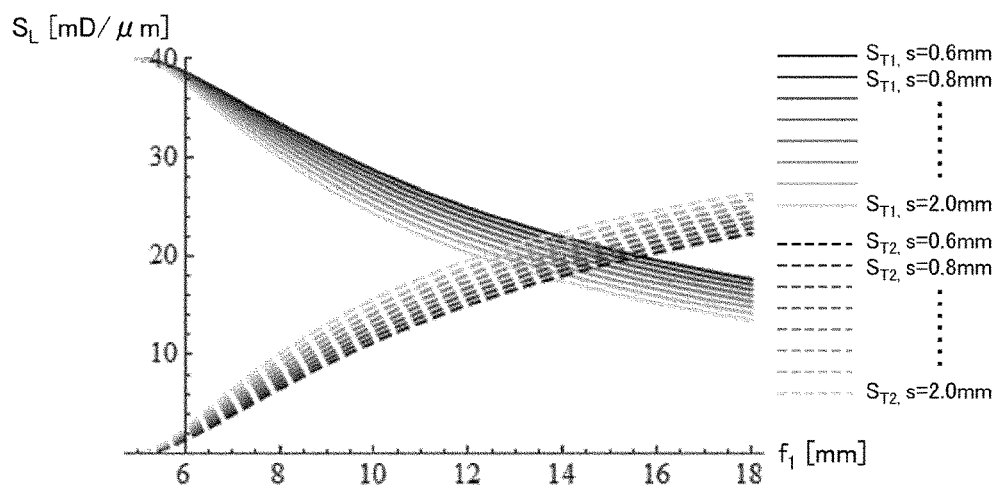
FIG. 8 is a graph illustrating how the focal length $f_1$ of a first lens is related to the respective collimation sensitivities of the first lens and a second lens, the graph illustrating a case where the separation (s) between a back principal plane of the first lens and a front principal plane of the second lens is changed between 0.6 mm to 2.0 mm.

The above calculations result in FIGS. 7 and 8. FIG. 7 is a graph illustrating how the focal length $f_2$ of the second lens 2 is related to the respective collimation sensitivities of the first lens 1 and second lens 2. FIG. 8 is a graph illustrating how the focal length $f_1$ of the first lens 1 is related to the respective collimation sensitivities of the first lens 1 and second lens 2, the graph illustrating a case where the separation (s) between the back principal plane 21 of the first lens 1 and the front principal plane 22 of the second lens 2 is changed between 0.6 mm to 2.0 mm. In FIGS. 7 and 8, f=5 mm.

Once $f_1$ and s have been determined, $f_2$ can be calculated on the basis of Formula 3 below.

$$f_2 = f \times (f_1 - s)/(f_1 - f) \quad \text{Formula 3}$$

FIGS. 7 and 8 show the following:

A) As $f_1$ increases, the collimation sensitivity of the first lens 1 decreases.

B) As $f_1$ increases, $f_2$ decreases. As $f_2$ decreases, the collimation sensitivity of the second lens 2 increases.

Balance Between Collimation Sensitivity and Beam-Steer Sensitivity

The above results show A) to C) below.

A) In a case where one lens of a two-lens device has been adjusted for collimation, and the other lens has been adjusted for beam steering, the collimation sensitivity and the beam-steer sensitivity need to be balanced. In the present embodiment, increasing the focal length $f_1$ of the first lens 1 decreases the collimation sensitivity of the first lens 1 and increases the beam-steer sensitivity of the second lens 2.

B) A two-lens device is desirably low in both collimation sensitivity and beam-steer sensitivity. The choice of the focal length $f_1$ of the first lens 1 can lower the collimation sensitivity or beam-steer sensitivity. Similarly, the choice of the separation s between the back principal plane 21 of the first lens 1 and the front principal plane 22 of the second lens 2 can, to an extent lesser than the focal length $f_1$ of the first lens 1, lower the collimation sensitivity or beam-steer sensitivity as well.

C) The collimation system 100 will achieve the advantages (a) and (b) over a single-lens device on the assumption that (i) the collimation system 100 (two-lens device) satisfies Formula 9 below and (ii) the effective focal length of the collimation system 100 is equal to the focal length of the single-lens device.

(a) The collimation sensitivity is lower than that of the single-lens device by more than 25%.

(b) The beam-steer sensitivity is lower than that of the single-lens device by more than 33%.

$$(2/\sqrt{3})f \leq f_2 \leq 3f \quad \text{Formula 9}$$

With reference to Formula 3, the effective focal length is expressed as in Formula 10 below.

$$f = (f_1 f_2)/(f_1 - f_2 - s) \quad \text{Formula 10}$$

Effective Focal Length Sensitivity

The effective focal length of a collimation optical system influences the achievable spot size. In a case where a light source has a plurality of separated emission areas for emitting light, the effective focal length sets the angular separation of collimated light from each emission area. Designing a projector including such a light source involves knowledge of the angular separation. A light source having a plurality of separated, individually drivable emission areas is useful for speckle reduction and/or for increasing the resolution of the display whilst keeping a high frame rate.

The effective focal length (f) of a two-lens device is more resilient to lens fabrication tolerances than the focal length of a single-lens device. After collimation adjustment of the first lens 1, the effective focal length variation depends on the respective focal lengths of the first lens 1 and the second lens 2 as shown in Formula 11 below.

$$\frac{\Delta f}{f} = \frac{1}{(2f_1 - f - s)} \left\{ (f-s)^2 \left(\frac{\Delta f_1}{f_1}\right)^2 + \frac{(f_1 - f)^2 [f f_1 + s(2f_1 - s)]^2}{f_1^2 (f-s)^2} \left(\frac{\Delta f_2}{f_2}\right)^2 \right\}^{1/2} \quad \text{Formula 11}$$

Figure 9:
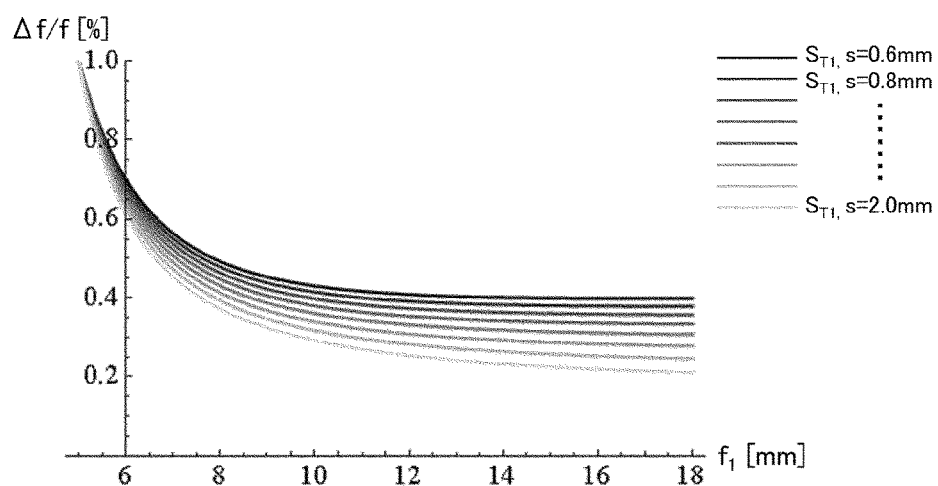
FIG. 9 is a graph illustrating how the focal length $f_1$ of a first lens is related to Δf/f, the graph illustrating a case where the separation (s) between a back principal plane of the first lens and a front principal plane of the second lens is changed between 0.6 mm to 2.0 mm.

FIG. 9 is a graph illustrating how the focal length $f_1$ of the first lens 1 is related to $\Delta f/f$, the graph illustrating a case where the separation (s) between the back principal plane 21 of the first lens 1 and the front principal plane 22 of the second lens 2 is changed between 0.6 mm to 2.0 mm.

In FIG. 9, the effective focal length f is 5 mm, and $\Delta f/f$ indicates the fractional effective focal length change (rms). The focal length variation $\Delta f_1/f_1$ of the first lens 1 is 1%, and the focal length variation $\Delta f_2/f_2$ of the second lens 2 is 1%. The respective focal length variations of the first lens 1 and the second lens 2 are statistically independent of each other.

As shown in FIG. 9, the fractional effective focal length change becomes less sensitive as $f_1$ increases, and the fractional effective focal length becomes less sensitive as the separation (s) increases.

The collimation system 100 is configured as described above. The collimation system 100 is, as described above, configured such that collimation adjustment and beam steering can be carried out independently of each other. Specifically, one of the two lenses is used for collimation adjustment, while the other lens is used for beam steering.

The collimation system 100 is configured such that the position of the first lens 1 is adjusted with use of the first support base 11, whereas the position of the second lens 2 is adjusted with use of the second support base 12.

This configuration allows each of the first lens 1 and the second lens 2 to have a small positioning sensitivity. The collimation system 100 is configured such that the respective positions of the first lens 1 and the second lens 2 can be adjusted with increased accuracy and that the first lens 1 and the second lens 2 can be aligned with improved tolerances as compared to a single-lens device.

The first lens 1 is placed on the first support base 11, whereas the second lens 2 is placed on the second support base 12. This configuration reduces the amount of an adhesive and/or the like for fixing the first lens 1 to the first support base 11 and the second lens 2 to the second support base 12, and thereby reduces the thickness of the layer of the adhesive and/or the like. This in turn allows the collimation system 100 to be more stable against environmental changes such as the temperature.

Embodiment 2

Figure 10:
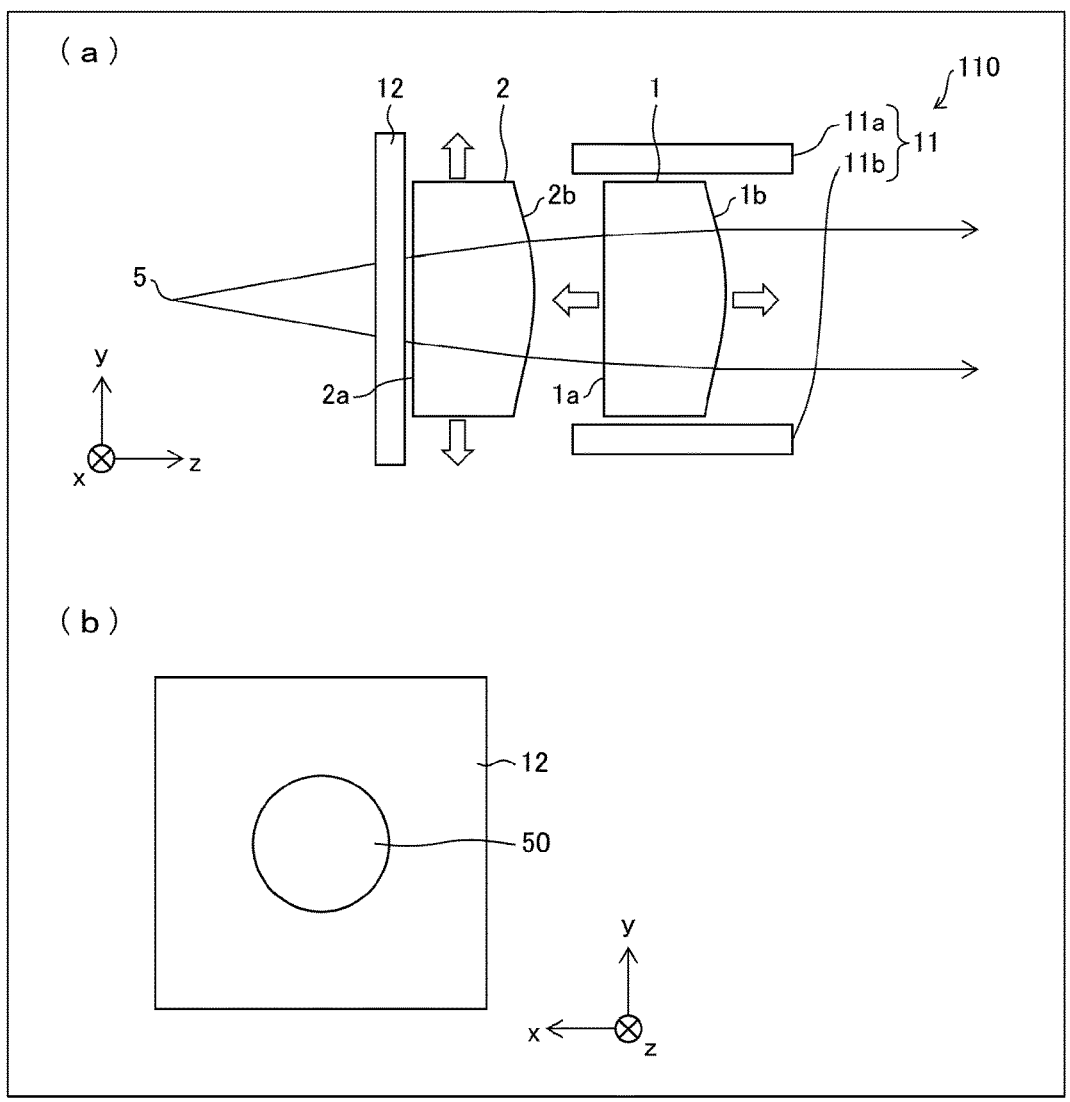
FIG. 10 is a diagram schematically illustrating a collimation system of an embodiment.

The following description will discuss a collimation system 110 of Embodiment 2 with reference to FIG. 10. FIG. 10 is a diagram schematically illustrating a collimation system 110 of the present embodiment. For convenience of description, any member of the present invention that is identical in function to a member described for Embodiment 1 is assigned the same reference sign, and is not described again here. This applies also to Embodiments 3 and later.

The collimation system 110 differs from the collimation system 100 in that in the collimation system 110, light emitted from the light source 5 is first incident on the second lens 2 and is then incident on the first lens 1. In terms of other configuration and operation (for example, the operation of the first support base 11 or second support base 12), the collimation system 110 is identical to the collimation system 100.

The collimation adjustment and beam steering for the collimation system 110 are followed by fixing the first lens 1 and the second lens 2 to the first support base 11 and the second support base 12, respectively, with use of an adhesive, for example. Alternatively, the first lens 1 may be fixed to the first support base 11 after the collimation adjustment and before the beam steering. In this case, fixing after the beam steering is only for the second lens 2 to the second support base 12.

Balance Between Collimation Sensitivity and Beam-Steer Sensitivity

The collimation system 110 will achieve the advantages (a) and (b) over a single-lens device on the assumption that (i) the collimation system 110 (two-lens device) satisfies Formula 12 below and (ii) the effective focal length of the collimation system 110 is equal to the focal length of the single-lens device.

(a) The collimation sensitivity is lower than that of the single-lens device by not less than 25%.

(b) The beam-steer sensitivity is lower than that of the single-lens device by not less than 33%.

$$(3/2)f \leq f_1 \leq 2f \qquad \text{Formula 12}$$

Effective Focal Length Sensitivity

After collimation adjustment of the first lens 1, the effective focal length variation depends on the respective focal lengths of the first lens 1 and the second lens 2 as shown in Formula 13 below.

$$\frac{\Delta f}{f} = \left\{ \frac{(f_1 - f)^2}{f^2} \left( \frac{\Delta f_2}{f_2} \right)^2 + \left( \frac{\Delta f_1}{f_1} \right)^2 \right\}^{1/2} \qquad \text{Formula 13}$$

Figure 11:
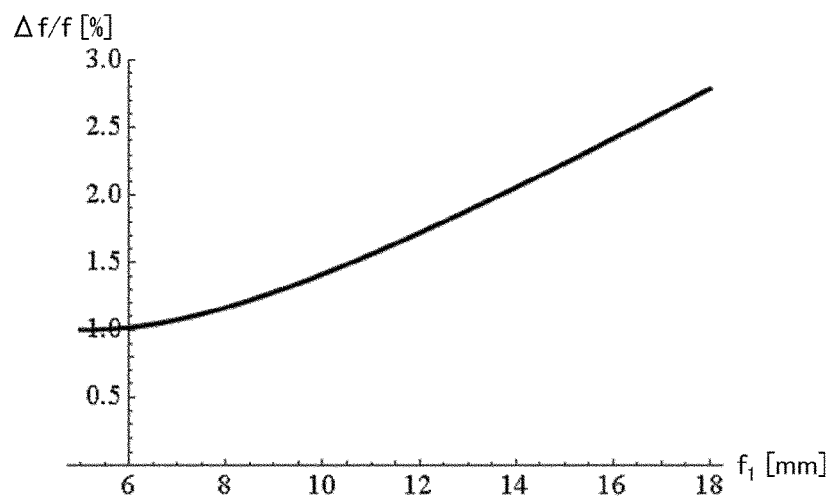
FIG. 11 is a graph illustrating how the focal length $f_1$ of a first lens is related to Δf/f.

FIG. 11 is a graph illustrating how the focal length $f_1$ of the first lens 1 is related to $\Delta f/f$. $\Delta f/f$ indicates the fractional effective focal length change (rms). The effective focal length f of the two-lens device is 5 mm. The focal length variation $\Delta f_1/f_1$ of the first lens 1 is 1%, and the focal length variation $\Delta f_2/f_2$ of the second lens 2 is 1%. The respective focal length variations of the first lens 1 and the second lens 2 are statistically independent of each other.

As shown in FIG. 11, the fractional effective focal length becomes more sensitive as $f_1$ increases. A comparison between the collimation system 100 (Embodiment 1) and the collimation system 110 (Embodiment 2) thus shows that the collimation system 100 is more suitable for a projector.

Embodiment 3

Figure 12:
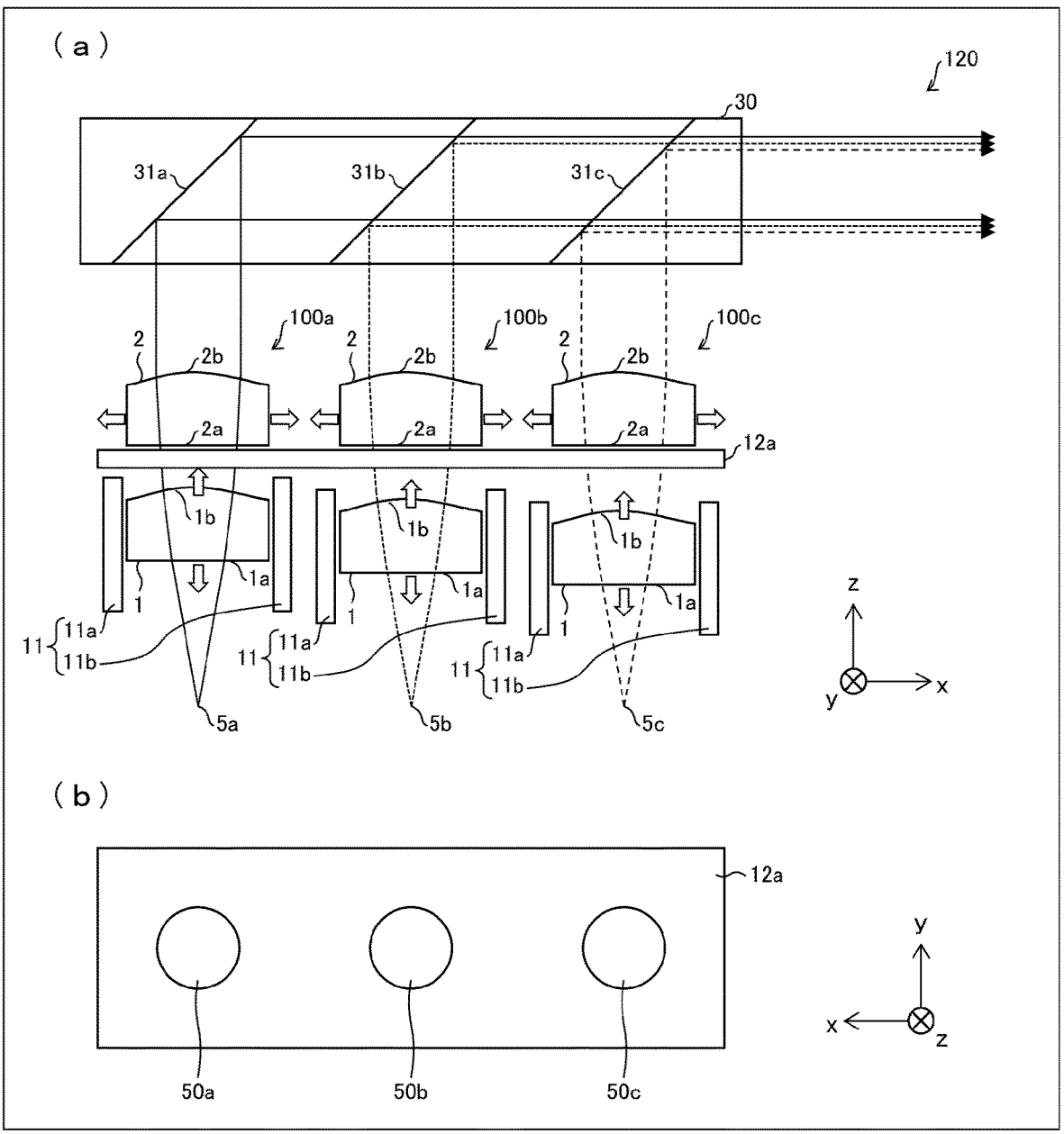
FIG. 12 is a diagram schematically illustrating a collimation system of an embodiment.

The following description will discuss a beam combining module 120 of Embodiment 3 with reference to FIG. 12. FIG. 12 is a diagram schematically illustrating a beam combining module 120 of the present embodiment.

The beam combining module 120 includes a collimation system 100a, a collimation system 100b, a collimation system 100c, a housing 30, a mirror 31a, a dichroic mirror 31b, and a dichroic mirror 31c.

The collimation system 100a, the collimation system 100b, and the collimation system 100c each correspond to the collimation system 100 of Embodiment 1. However, the beam combining module 120 includes only one second support base 12a. This point will be described later. The mirror 31a, the dichroic mirror 31b, and the dichroic mirror 31c are contained in the housing 30. The housing 30 may be made of glass so the combination 30, 31a, 31b, 31c form a dichroic prism.

The collimation system 100a, the collimation system 100b, and the collimation system 100c are provided respectively with a light source 5a, a light source 5b, and a light source 5c. The light source 5a, the light source 5b, and the light source 5c are configured to emit light having respective colors different from each other. For instance, the light source 5a is configured to emit red light, the light source 5b is configured to emit green light, and the light source 5c is configured to emit blue light. In Embodiment 3, the light source 5a, the light source 5b, and the light source 5c do not need to be placed on the same plane.

As mentioned above, the beam combining module 120 includes only one second support base 12a. In other words, the three second lenses 2 share a single second support base 12a. The three second lenses 2 are thus moved together by means of the operation of the second support base 12a.

The second support base 12a has an aperture 50a, an aperture 50b, and an aperture 50c. The aperture 50a corresponds to the collimation system 100a. The aperture 50b corresponds to the collimation system 100b. The aperture 50c corresponds to the collimation system 100c.

Light emitted from the light source 5a travels through the collimation system 100a to be reflected on the mirror 31a. The light reflected on the mirror 31a travels through the dichroic mirror 31b and the dichroic mirror 31c to exit from the beam combining module 120.

Light emitted from the light source 5b travels through the collimation system 100b to be reflected on the dichroic mirror 31b. The light reflected on the dichroic mirror 31b travels through the dichroic mirror 31c to exit from the beam combining module 120.

Light emitted from the light source 5c travels through the collimation system 100c to be reflected on the dichroic mirror 31c. The light reflected on the dichroic mirror 31c exits from the beam combining module 120.

Light with mixed colors of red, green, and blue is emitted to the outside of the beam combining module 120 as described above. The respective colors of light emitted by the light source 5a, the light source 5b, and the light source 5c are not limited to any particular ones. The light source 5a, the light source 5b, and the light source 5c may each be a laser configured to emit, for example, an ultraviolet ray, an X ray, or an infrared ray.

For an optical system including a lens, the lens material (glass or plastic) has a refractive index that varies according to the wavelength of light incident on the lens. It follows that the properties of an image formed also vary according to the wavelength. The term "chromatic aberration" refers to how an image varies according to the wavelength of light incident on the lens. The beam combining module 120 is configured to, in view of chromatic aberration, adjust the separation between the first lens 1 and the second lens 2 of each collimation system in correspondence with the wavelength of light emitted from the corresponding light source 5. This configuration allows each collimation system to have an intended effective focal length.

More specifically, the beam combining module 120 is configured to adjust (1) the respective positions of the light sources 5a to 5c in correspondence with the respective wavelengths of light emitted from the light sources 5a to 5c, (2) the respective positions of the three first lenses 1 individually, and/or (3) the respective positions of the three second lenses 2 together by means of the operation of the second support base 12a. This configuration allows the beam combining module 120 to (i) correct chromatic aberration of each of the collimation system 100a, the collimation system 100b, and the collimation system 100c and (ii) emit light with mixed colors of red, green, and blue to the outside of the beam combining module 120.

The above description assumes that the beam combining module 120 includes three collimation systems 100. However, the beam combining module 120 may include any plurality (that is, any number that is two or more) of collimation systems 100.

Embodiment 4

Figure 13:
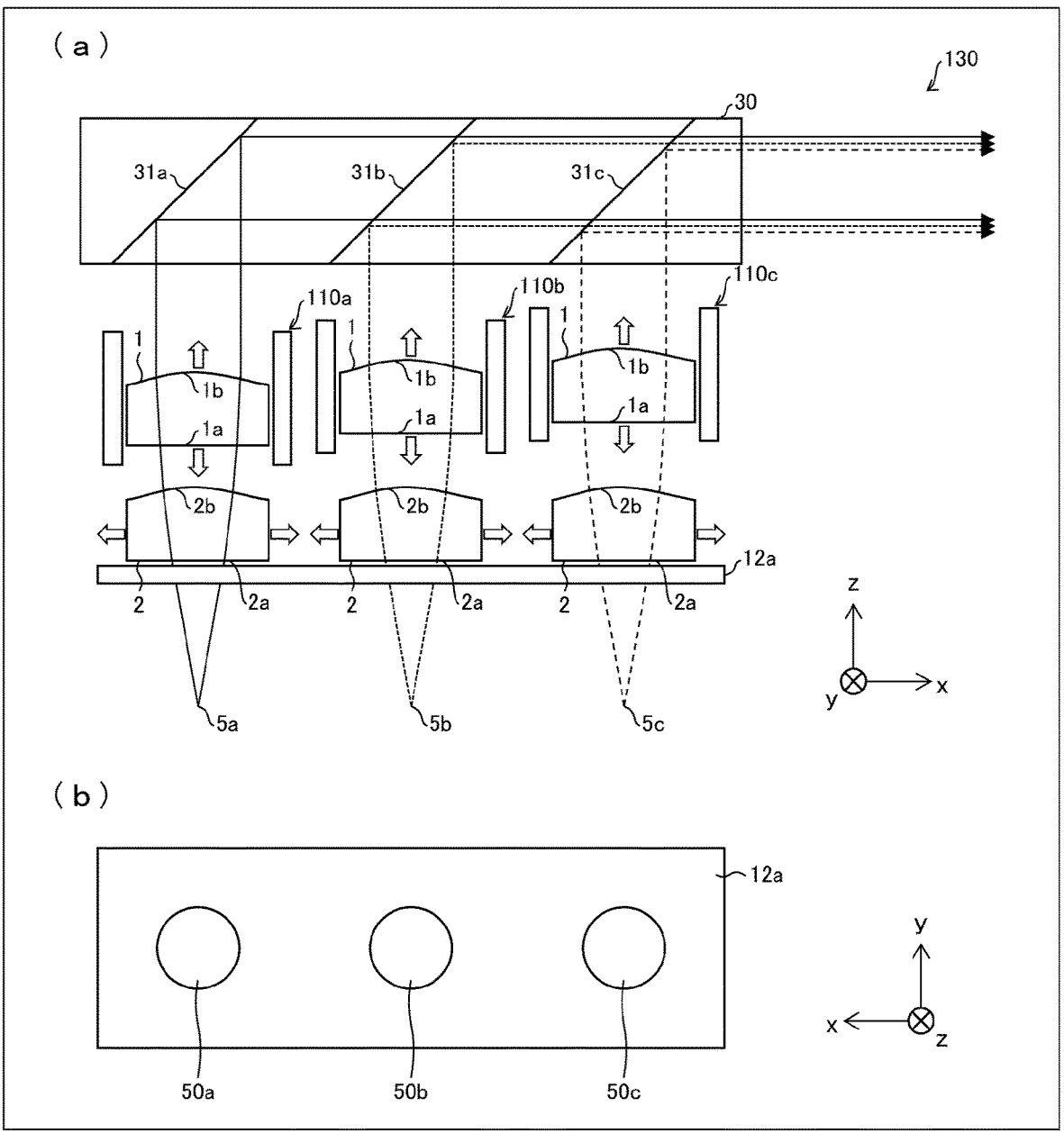
FIG. 13 is a diagram schematically illustrating a collimation system of an embodiment.

The following description will discuss a beam combining module 130 of Embodiment 4 with reference to FIG. 13. FIG. 13 is a diagram schematically illustrating a beam combining module 130 of the present embodiment.

The beam combining module 130 includes a collimation system 110a, a collimation system 110b, a collimation system 110c, a housing 30, a mirror 31a, a dichroic mirror 31b, and a dichroic mirror 31c.

The collimation system 110a, the collimation system 110b, and the collimation system 110c each correspond to the collimation system 110 of Embodiment 2. However, the beam combining module 130 includes only one second support base 12. This point will be described later.

The collimation system 110a, the collimation system 110b, and the collimation system 110c are provided respectively with a light source 5a, a light source 5b, and a light source 5c. The light source 5a, the light source 5b, and the light source 5c are configured to emit light having respective colors different from each other. For instance, the light source 5a is configured to emit red light, the light source 5b is configured to emit green light, and the light source 5c is configured to emit blue light.

As mentioned above, the beam combining module 130 includes only one second support base 12. In other words, the three second lenses 2 share a single second support base 12a. The three second lenses 2 are thus moved together by means of the operation of the second support base 12a.

The second support base 12a has an aperture 50a, an aperture 50b, and an aperture 50c. The aperture 50a corresponds to the collimation system 110a. The aperture 50b corresponds to the collimation system 110b. The aperture 50c corresponds to the collimation system 110c.

Light emitted from the light source 5a travels through the collimation system 110a to be reflected on the mirror 31a. The light reflected on the mirror 31a travels through the dichroic mirror 31b and the dichroic mirror 31c to exit from the beam combining module 130.

Light emitted from the light source 5b travels through the collimation system 110b to be reflected on the dichroic mirror 31b. The light reflected on the dichroic mirror 31b travels through the dichroic mirror 31c to exit from the beam combining module 130.

Light emitted from the light source 5c travels through the collimation system 110c to be reflected on the dichroic mirror 31c. The light reflected on the dichroic mirror 31c to exit from the beam combining module 130.

Light with mixed colors of red, green, and blue is emitted to the outside of the beam combining module 130 as described above.

The beam combining module 130 is configured to adjust (1) the respective positions of the light sources 5a to 5c in correspondence with the respective wavelengths of light emitted from the light sources 5a to 5c, (2) the respective positions of the three first lenses 1 individually, and/or (3) the respective positions of the three second lenses 2 together by means of the operation of the second support base 12a. This configuration allows the beam combining module 130 to (i) correct chromatic aberration of each of the collimation system 110a, the collimation system 110b, and the collimation system 110c and (ii) emit light with mixed colors of red, green, and blue to the outside of the beam combining module 130.

The above description assumes that the beam combining module 130 includes three collimation systems 110. However, the beam combining module 130 may include any plurality (that is, any number that is two or more) of collimation systems 110.

Embodiment 5

Figure 14:
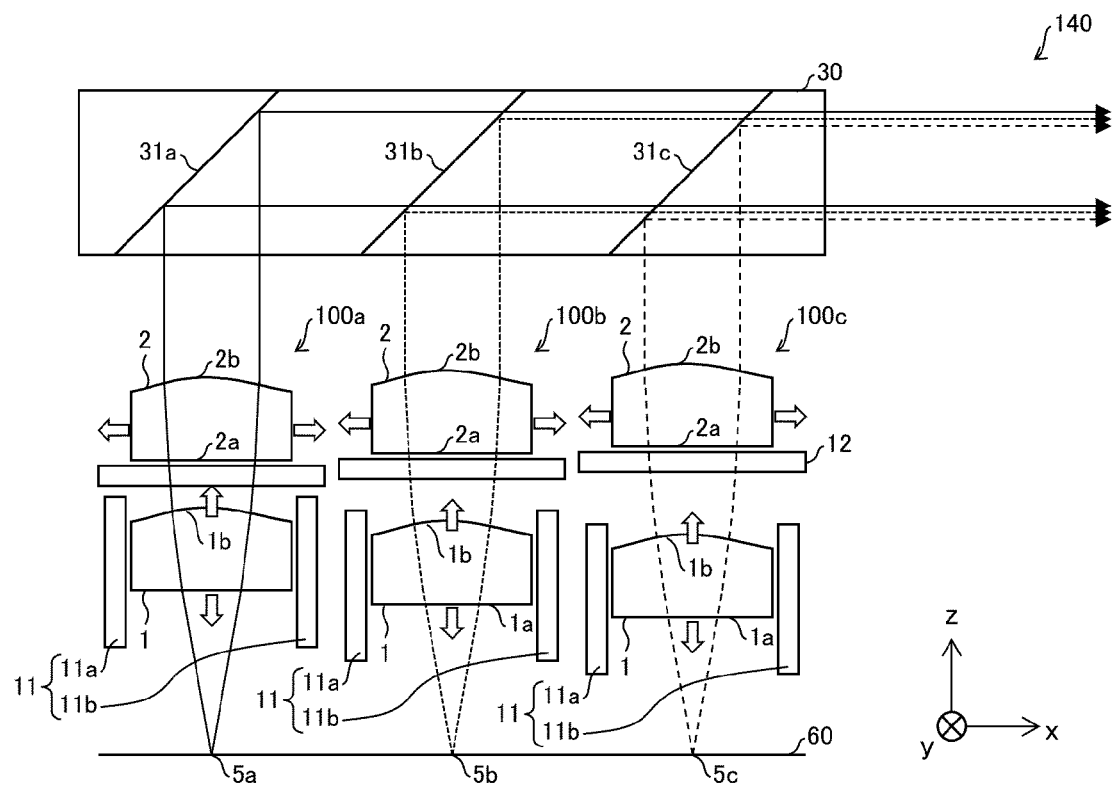
FIG. 14 is a diagram schematically illustrating a collimation system of an embodiment.

The following description will discuss a beam combining module 140 of Embodiment 5 with reference to FIG. 14. FIG. 14 is a diagram schematically illustrating a beam combining module 140 of the present embodiment.

The beam combining module 140 differs from the beam combining module 120 of Embodiment 3 on points (1) and (2) below.

(1) The beam combining module 140 is configured such that the light source 5a, the light source 5b, and the light source 5c are placed on the same plane 60. The light source 5a, the light source 5b, and the light source 5c are each, for example, contained in a can-type package. This configuration allows the light sources 5a to 5c to be mounted in the beam combining module 140 easily.

(2) The beam combining module 140 is configured such that the collimation system 100a, the collimation system 100b, and the collimation system 100c include respective second support bases 12 so that the three second lenses 2 are operable independently of one another. With this configuration, the beam combining module 140 allows all the lenses to be moved independently of one another and thereby allows the respective positions of those lenses to be adjusted with high accuracy.

The beam combining module 140, which is configured as described in (1) and (2) above, can be compact. This in turn allows a device (for example, a projector) including the beam combining module 140 to be compact as well. Further, since the light source 5a, the light source 5b, and the light source 5c are placed on the same plane 60, the beam combining module 140 can be handled easily. As a result, a device designed to include the beam combining module 140 can be assembled easily and rapidly.

The above description assumes that the beam combining module 140 includes three collimation systems 100. However, the beam combining module 140 may include any plurality (that is, any number that is two or more) of collimation systems 100.

Embodiment 6

Figure 15:
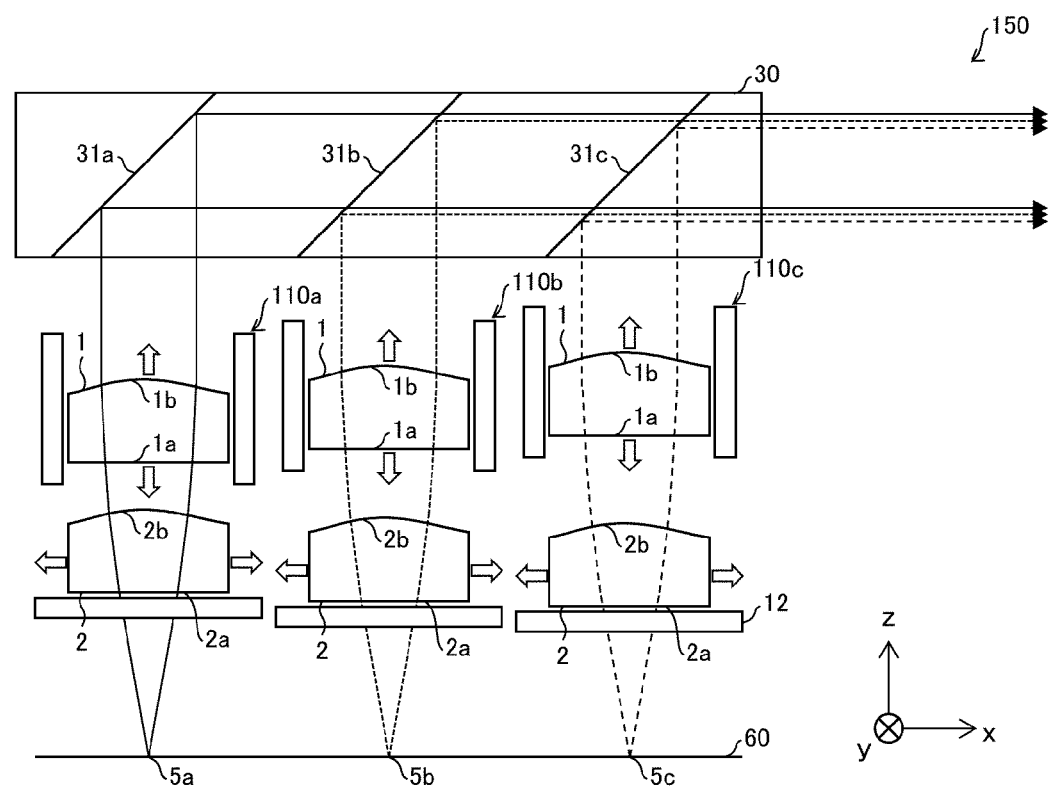
FIG. 15 is a diagram schematically illustrating a collimation system of an embodiment.

The following description will discuss a beam combining module 150 of Embodiment 6 with reference to FIG. 15. FIG. 15 is a diagram schematically illustrating a beam combining module 150 of the present embodiment.

The beam combining module 150 differs from the beam combining module 130 of Embodiment 4 on points (1) and (2) below.

(1) The beam combining module 150 is configured such that the light source 5a, the light source 5b, and the light source 5c are placed on the same plane 60. The light source 5a, the light source 5b, and the light source 5c are each, for example, contained in a can-type package. This configuration allows the light sources 5a to 5c to be mounted in the beam combining module 150 easily.

(2) The beam combining module 150 is configured such that the collimation system 110a, the collimation system 110b, and the collimation system 110c include respective second support bases 12 so that the three second lenses 2 are operable independently of one another. With this configuration, the beam combining module 150 allows all the lenses to be moved independently of one another and thereby allows the respective positions of those lenses to be adjusted with high accuracy.

The beam combining module 150, which is configured as described in (1) and (2) above, can be compact. This in turn allows a device (for example, a projector) including the beam combining module 150 to be compact as well. Further, since the light source 5a, the light source 5b, and the light source 5c are placed on the same plane 60, the beam combining module 150 can be handled easily. As a result, a device designed to include the beam combining module 150 can be assembled easily and rapidly.

The above description assumes that the beam combining module 150 includes three collimation systems 110. However, the beam combining module 150 may include any plurality (that is, any number that is two or more) of collimation systems 110.

Applications

The collimation system 100, 110 is, as described above, configured such that collimation adjustment and beam steering can be carried out independently of each other. Specifically, one of the two lenses is used for collimation adjustment, while the other lens is used for beam steering.

This configuration allows each of the first lens 1 and the second lens 2 to have a small positioning sensitivity. The collimation system 100, 110 is configured such that the respective positions of the first lens 1 and the second lens 2 can be adjusted with increased accuracy and that the first lens 1 and the second lens 2 can be aligned with improved tolerances as compared to a single-lens device.

As described above, the collimation system 100, 110 enjoys various benefits that are unachievable by conventional single-lens devices.

Combining a plurality of collimation systems 100, 110 makes it possible to produce a beam combining module that enjoys the above benefits. Such a beam combining module is any of the beam combining modules 120 to 150 of Embodiments 3 to 6 as proposed.

As described above, the beam combining modules 120 to 150 are each advantageously configured to (1) enjoy the benefits of the collimation system 100, 110, (2) efficiently generate light having a plurality of colors that are not limited to any particular ones and emit such generated light to the outside of the beam combining module, and (3) be compact.

The beam combining modules 120 to 150 are each suitably usable in, for example, a laser projection system. The laser projection system is, in particular, suitably a small laser projection system including a MEMS scanning mirror to create an image.

Recap

A two-lens optical system in accordance with a first aspect of the present invention is a two-lens optical system, including: a first lens for use in collimation adjustment, the first lens being configured to move along only an optical axis of light emitted from a light source; and a second lens for use in beam steering, the second lens being configured to move along only two axes perpendicular to the optical axis.

With the above configuration, the two-lens optical system is configured such that the first lens is used for collimation adjustment, whereas the second lens is used for beam steering.

The above configuration thus allows each of the first lens and the second lens to have a small positioning sensitivity. The two-lens optical system is configured such that the respective positions of the first lens and the second lens can be adjusted with increased accuracy and that the first lens and the second lens can be aligned with improved tolerances as compared to a single-lens device.

A two-lens optical system in accordance with a second aspect of the present invention is configured as in the first aspect and may be further configured such that the light source, the first lens, and the second lens are arranged in this order along the optical axis.

With the above configuration, increasing the focal length of the first lens causes the effective focal length to be less sensitive to displacements of the first lens. Further, increasing the separation between the back principal plane of the first lens and the front principal plane of the second lens allows the two-lens optical system to have a less sensitive effective focal length.

A two-lens optical system in accordance with a third aspect of the present invention is configured as in the second aspect and may be further configured such that $$(2/\sqrt{3})f \le f_2 \le 3f,$$

where $f=(f_1 f_2)/(f_1+f_2-s)$, where f is an effective focal length of the two-lens optical system;

$f_1$ is a focal length of the first lens;
$f_2$ is a focal length of the second lens; and
s is a separation between a back principal plane of the first lens and a front principal plane of the second lens.

With the above configuration, the two-lens optical system will achieve the advantages (a) and (b) below over a single-lens device on the assumption that the effective focal length of the two-lens optical system is equal to the focal length of the single-lens device.

(a) The collimation sensitivity is lower than that of the single-lens device by not less than 25%.

(b) The beam-steer sensitivity is lower than that of the single-lens device by not less than 33%.

A two-lens optical system in accordance with a fourth aspect of the present invention is configured as in the first aspect and may be further configured such that the light source, the second lens, and the first lens are arranged in this order along the optical axis.

The above configuration also allows each of the first lens and the second lens to have a small positioning sensitivity. The two-lens optical system is configured such that the respective positions of the first lens and the second lens can be adjusted with increased accuracy and that the first lens and the second lens can be aligned with improved tolerances as compared to a single-lens device.

A two-lens optical system in accordance with a fifth aspect of the present invention is configured as in the fourth aspect and may be further configured such that $$(3/2)f \le f_1 \le 2f,$$

where $f=(f_1 f_2)/(f_1+f_2-s)$, where f is an effective focal length of the two-lens optical system;
$f_1$ is a focal length of the first lens;
$f_2$ is a focal length of the second lens; and
s is a separation between a back principal plane of the first lens and a front principal plane of the second lens.

With the above configuration, the two-lens optical system will achieve the advantages (a) and (b) below over a single-lens device on the assumption that the effective focal length of the two-lens optical system is equal to the focal length of the single-lens device.

(a) The collimation sensitivity is lower than that of the single-lens device by not less than 25%.

(b) The beam-steer sensitivity is lower than that of the single-lens device by not less than 33%.

A two-lens optical system in accordance with a sixth aspect of the present invention is configured as in any one of the first to fifth aspects and may further include: a first support base on which the first lens is placed, the first support base being configured to constrain movement of the first lens; and a second support base on which the second lens is placed, the second support base being configured to constrain movement of the second lens. This configuration facilitates alignment of the first lens and the second lens.

A two-lens optical system in accordance with a seventh aspect of the present invention is configured as in any one of the first to fifth aspects and may further include: a first support base on which the first lens is placed, the first support base being configured to move the first lens; and a second support base on which the second lens is placed, the second support base being configured to move the second lens.

The above configuration allows (i) the first support base to move the first lens only along the optical axis of light emitted from the light source and (ii) the second support base to move the second lens only in directions perpendicular to the optical axis.

The above configuration facilitates alignment of the first lens and the second lens.

A beam combining module in accordance with an eighth aspect of the present invention, the beam combining module including m optical devices each including a two-lens optical system and a mirror configured to reflect light emitted from the two-lens optical system, a first one of the optical devices including a reflective mirror as the mirror, second through m-th ones of the optical devices each including a dichroic mirror as the mirror, the beam combining module being configured such that light reflected on the mirror included in an n-th one of the optical devices passes through the mirror included in each of (n+1)th through m-th ones of the optical devices, may include m optical devices each including (i) a light source, (ii) a two-lens optical system according to the first to fifth aspects, and (iii) a mirror configured to reflect light emitted from the two-lens optical system, where m is an integer of 2 or more, a first one of the optical devices including a reflective mirror as the mirror, second through m-th ones of the optical devices each including a dichroic mirror as the mirror, the beam combining module being configured such that light reflected on the mirror included in an n-th one of the optical devices passes through the mirror included in each of (n+1)th through m-th ones of the optical devices, where n is an integer of 1 or more, and $1 \le n \le m-1$.

With the above configuration, adjusting the wavelength of light emitted by the light source included in each of the m optical devices allows light having mixed colors that are not limited to any particular ones to be emitted to the outside of the beam combining module.

In addition, the beam combining module, which includes the above two-lens optical system, enjoys the benefits of the effects produced by the two-lens optical system.

A beam combining module in accordance with a ninth aspect of the present invention is configured as in the eighth aspect and may be further configured such that the m optical devices further include m respective second lenses; and the beam combining module further includes a single second support base.

The above configuration allows a single second support base and m second lenses to move together. This makes it possible to adjust the respective positions of the m second lenses of the beam combining module easily and rapidly.

A beam combining module in accordance with a tenth aspect of the present invention is configured as in the eighth aspect and may be further configured such that the respective light sources included in the m optical devices are placed on an identical plane.

The above configuration allows the beam combining module to be compact.

The above configuration in turn allows a device (for example, a projector) including the beam combining module to be compact as well. Further, the beam combining module, which is configured as described above, enables greater modularization. As a result, a device designed to include the beam combining module can be assembled easily and rapidly.

A projector in accordance with an eleventh aspect of the present invention may include a beam combining module in accordance with any one of the eighth to tenth aspects.

The above configuration makes it possible to provide a projector capable of producing the above effects.

A method in accordance with a twelfth aspect of the present invention for assembling a two-lens optical system is a method for assembling a two-lens optical system, the two-lens optical system including: a first lens; a first support base configured to constrain movement of the first lens in such a manner that the first lens is movable along only an optical axis of light emitted from a light source; a second lens; and a second support base configured to constrain movement of the second lens in such a manner that the second lens is movable along only two axes perpendicular to the optical axis, the method comprising the steps of: (a) moving the first lens along the optical axis for collimation adjustment of the two-lens optical system; (b) after the step (a), moving the second lens along at least one of the two axes for beam steering of the two-lens optical system; (c) after the step (a) or (b), fixing the first lens to the first support base; and (d) after the step (b), fixing the second lens to the second support base.

A method in accordance with a thirteenth aspect of the present invention for assembling a two-lens optical system is a method for assembling a two-lens optical system, the two-lens optical system including: a first support base configured to move along only an optical axis of light emitted from a light source, a first lens configured to move together with the first support base; a second support base configured to move along only two axes perpendicular to the optical axis; and a second lens configured to move together with the second support base, the method including the steps of: (a) moving the first support base for collimation adjustment of the two-lens optical system; (b) after the step (a), moving the second support base for beam steering of the two-lens optical system; (c) after the step (a) or (b), fixing the first lens to the first support base; and (d) after the step (b), fixing the second lens to the second support base.

The above arrangement makes it possible to easily assemble a two-lens optical system capable of producing the above effects.

The present invention is not limited to the description of the embodiments above, but may be altered in various ways by a skilled person within the scope of the claims. The present invention encompasses, in its technical scope, any embodiment based on an appropriate combination of technical means disclosed in different embodiments.

REFERENCE SIGNS LIST

1 First lens
1a, 2a, 23, 60 Plane
1b, 2b Convex surface
2 Second lens
5, 5a, 5b, 5c Light source
11 First support base
11a, 11b First support base component
12, 12a Second support base
21 Back principal plane
22 Front principal plane
30 Housing
31a Mirror
31b, 31c Dichroic mirror
50, 50a, 50b, 50c Aperture
100, 100a, 100b, 100c, 110, 110a, 110b, 110c Collimation system (two-lens optical system)
120, 130, 140, 150 Beam combining module
c Collimation
f Effective focal length
$f_1$ Focal length of first lens
$f_2$ Focal length of second lens
s Separation
v Displacement

The invention claimed is:

1. A two-lens optical system, comprising:
a first lens for use in collimation adjustment, the first lens being configured to move along only an optical axis of light emitted from a light source; and
a second lens for use in beam steering, the second lens being configured to move along only two axes perpendicular to the optical axis.

2. The two-lens optical system according to claim 1, wherein
the light source, the first lens, and the second lens are arranged in this order along the optical axis.

3. The two-lens optical system according to claim 2, wherein $(2/\sqrt{3})f \leq f_2 \leq 3f$, where $f=(f_1 f_2)/(f_1+f_2-s)$, where f is an effective focal length of the two-lens optical system;
$f_1$ is a focal length of the first lens;
$f_2$ is a focal length of the second lens; and
s is a separation between a back principal plane of the first lens and a front principal plane of the second lens.

4. The two-lens optical system according to claim 1, wherein
the light source, the second lens, and the first lens are arranged in this order along the optical axis.

5. The two-lens optical system according to claim 4, wherein $(3/2)f \leq f_1 \leq 2f$, where $f=(f_1 f_2)/(f_1+f_2-s)$, where f is an effective focal length of the two-lens optical system;
$f_1$ is a focal length of the first lens;
$f_2$ is a focal length of the second lens; and
s is a separation between a back principal plane of the first lens and a front principal plane of the second lens.

6. The two-lens optical system according to claim 1, further comprising:
a first support base on which the first lens is placed, the first support base being configured to constrain movement of the first lens; and
a second support base on which the second lens is placed, the second support base being configured to constrain movement of the second lens.

7. The two-lens optical system according to claim 1, further comprising:
a first support base on which the first lens is placed, the first support base being configured to move the first lens; and
a second support base on which the second lens is placed, the second support base being configured to move the second lens.

8. A beam combining module, comprising:
m optical devices each including (i) a light source, (ii) a two-lens optical system according to claim 1, and (iii) a mirror configured to reflect light emitted from the two-lens optical system, where m is an integer of 2 or more,
a first one of the optical devices including a reflective mirror as the mirror,
second through m-th ones of the optical devices each including a dichroic mirror as the mirror,
the beam combining module being configured such that light reflected on the mirror included in an n-th one of the optical devices passes through the mirror included in each of (n+1)th through m-th ones of the optical devices, where n is an integer of 1 or more, and $1 \leq n \leq m-1$.

9. The beam combining module according to claim 8, wherein
the m optical devices further include m respective second lenses; and
the beam combining module further comprises a single second support base.

10. The beam combining module according to claim 8, wherein
the respective light sources included in the m optical devices are placed on an identical plane.

11. A projector, comprising:
a beam combining module according to claim 8.

12. A method for assembling a two-lens optical system, the two-lens optical system including:
a first lens;
a first support base configured to constrain movement of the first lens in such a manner that the first lens is movable along only an optical axis of light emitted from a light source;
a second lens; and
a second support base configured to constrain movement of the second lens in such a manner that the second lens is movable along only two axes perpendicular to the optical axis,
the method comprising the steps of:
(a) moving the first lens along the optical axis for collimation adjustment of the two-lens optical system;
(b) after the step (a), moving the second lens along at least one of the two axes for beam steering of the two-lens optical system;
(c) after the step (a) or (b), fixing the first lens to the first support base; and
(d) after the step (b), fixing the second lens to the second support base.

13. A method for assembling a two-lens optical system, the two-lens optical system including:
a first support base configured to move along only an optical axis of light emitted from a light source,
a first lens configured to move together with the first support base;
a second support base configured to move along only two axes perpendicular to the optical axis; and
a second lens configured to move together with the second support base,
the method comprising the steps of:
(a) moving the first support base for collimation adjustment of the two-lens optical system;
(b) after the step (a), moving the second support base for beam steering of the two-lens optical system;
(c) after the step (a) or (b), fixing the first lens to the first support base; and
(d) after the step (b), fixing the second lens to the second support base.

* * * * *